US 6,715,055 B1

(12) United States Patent
Hughes

(10) Patent No.: US 6,715,055 B1
(45) Date of Patent: Mar. 30, 2004

(54) APPARATUS AND METHOD FOR ALLOCATING BUFFER SPACE

(75) Inventor: William Alexander Hughes, Burlingame, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 358 days.

(21) Appl. No.: 09/981,618

(22) Filed: Oct. 15, 2001

(51) Int. Cl.[7] .............................................. G06F 17/00
(52) U.S. Cl. ..................... 711/170; 711/147; 711/148; 711/154; 711/155; 709/238; 709/239; 709/240; 710/52; 710/53; 710/54; 710/56; 710/57
(58) Field of Search ......................... 710/52, 53, 54, 710/56, 57; 709/238, 239, 240; 711/147, 148, 170, 154, 155

(56) References Cited

U.S. PATENT DOCUMENTS

| | | | |
|---|---|---|---|
| 5,495,619 A | * 2/1996 | May et al. ................... 709/245 |
| 5,533,198 A | 7/1996 | Thorson ....................... 709/239 |
| 5,583,990 A | * 12/1996 | Birrittella et al. ............. 712/29 |
| 5,659,796 A | 8/1997 | Thorson et al. .............. 709/241 |
| 5,748,900 A | 5/1998 | Scott et al. ................... 709/235 |
| 5,749,095 A | 5/1998 | Hagersten .................... 709/245 |
| 5,754,789 A | 5/1998 | Nowatzyk et al. ........... 709/233 |
| 5,797,035 A | * 8/1998 | Birrittella et al. ............. 710/38 |
| 5,848,068 A | * 12/1998 | Daniel et al. ........... 370/395.43 |
| 5,850,395 A | * 12/1998 | Hauser et al. ................ 370/398 |
| 5,870,384 A | 2/1999 | Salovuori et al. ............ 370/235 |
| 5,936,956 A | 8/1999 | Naven ....................... 370/395.7 |
| 6,005,851 A | 12/1999 | Craddock et al. ............ 370/329 |
| 6,101,420 A | 8/2000 | VanDoren et al. .............. 700/5 |
| 6,157,967 A | * 12/2000 | Horst et al. .................... 710/19 |
| 6,205,508 B1 | 3/2001 | Bailey et al. ................. 710/260 |
| 6,256,674 B1 | 7/2001 | Manning et al. ............. 709/232 |
| 6,370,600 B1 | 4/2002 | Hughes et al. ................. 710/29 |
| 6,370,621 B1 | 4/2002 | Keller .......................... 711/141 |
| 6,389,526 B1 | 5/2002 | Keller et al. .................. 712/30 |
| 6,426,957 B1 | * 7/2002 | Hauser et al. ................ 370/413 |
| 6,484,220 B1 | * 11/2002 | Alvarez, II et al. ........... 710/46 |

FOREIGN PATENT DOCUMENTS

| EP | 841 617 | 5/1998 |
| GB | 2 360 168 | 9/2001 |

OTHER PUBLICATIONS

Adve et al., "Performance Analysis of Mesh Interconnection Networks with Deterministic Routing," 1994, pp. 1–40.
International Search Report for PCT/US 02/25405, mailed Dec. 30, 2002, 6 pages.
U.S. Publication No. 2001/0051977, Published Dec. 13, 2001, Hagersten.*
U.S. Publication No. 2001/0044874, Published Nov. 22, 2001, Watanabe, et al.*

* cited by examiner

Primary Examiner—T. Nguyen
(74) Attorney, Agent, or Firm—Lawrence J. Merkel; Meyertons, Hood, Kivlin, Kowert & Goetzel, P.C.; Stephen J. Curran

(57) ABSTRACT

An apparatus is described in which the locations of a buffer are used to store a plurality of control packets received in a node, wherein the plurality of control packets belong to a plurality of virtual channels. The number of locations assigned to each virtual channel may be dynamically allocated. The number of locations allocated to each virtual channel may be determined by an update circuit. Count values corresponding to the number of locations allocated to each virtual channel may then be stored within a programmable storage, such as a register, for example. The count values may be subsequently copied into a slave register and incremented and decremented as locations become available and notifications corresponding to the available locations are sent, respectively.

28 Claims, 9 Drawing Sheets

| BIT TIME | 7 | 6 | 5 | 4 | 3 | 2 | 1 | 0 |
|---|---|---|---|---|---|---|---|---|
| 0 | RSV | | | | CMD[5:0] | | | |
| 1 | RESPONSE DATA [1:0] | | RESPONSE [1:0] | | POSTDATA [1:0] | | POSTCMD [1:0] | |
| 2 | LINK TYPE 1 | RSV | PROBE [1:0] | | NON-POSTDATA[1:0] | | NON-POSTCMD[1:0] | |
| 3 | RSV | | | | | | | |

COHERENT NOP PACKET 610

*FIG. 6*

APPARATUS AND METHOD FOR ALLOCATING BUFFER SPACE

BACKGROUND OF THE INVENTION

1. Field of the Invention

This invention relates to computer system nodes and, more particularly, to buffer space allocation within those nodes.

2. Description of the Related Art

In a typical computer system, one or more processors may communicate with input/output (I/O) devices over one or more buses. In addition those processors may communicate with each other through an additional bus or buses. In many cases, these buses are shared buses.

Unfortunately, many shared bus systems suffer from drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by many systems is a front side bus (FSB), which may typically interconnect one or more processors and a system controller.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

In some instances, a node may have multiple packet interface circuits. These interface circuits may use buffering mechanisms to buffer a number of different types of pending transactions from a source node to a destination node. However some buffering mechanisms may require large numbers of buffers to handle the different types of transactions. Large numbers of buffers may require significant die area of an integrated circuit chip. Therefore, during design, tradeoffs may sometimes be made between performance and die area.

SUMMARY OF THE INVENTION

Various embodiments of an apparatus and method for allocating buffer space are disclosed. An apparatus is described in which the locations of a buffer are used to store a plurality of control packets received in a node, wherein the plurality of control packets belong to a plurality of virtual channels. The number of locations assigned to each virtual channel may be dynamically allocated. The number of locations allocated to each virtual channel may be determined by an update circuit. Count values corresponding to the number of locations allocated to each virtual channel may then be stored within a programmable storage, such as a register, for example. The count values may be subsequently copied into a slave register and incremented and decremented as locations become available and notifications corresponding to the available locations are sent, respectively.

Broadly speaking, in one embodiment, an apparatus is contemplated which includes a buffer including a plurality of storage locations configured to store a plurality of control packets each belonging to one of a plurality of virtual channels. The apparatus also includes a programmable storage configured to store a plurality of count values. Each of the count values is indicative of a number of the storage locations allocated to a respective one of the plurality of virtual channels. Further, the apparatus includes an update circuit configured to write the plurality of count values to the programmable storage.

In one specific implementation, the update circuit may be further configured to determine the number of the plurality of locations to allocate to each of the plurality of virtual channels. Further, the apparatus may include a control circuit coupled to the programmable storage. The control circuit may be configured to cause a plurality of default count values to be stored within the programmable storage in response to detecting a cold reset. The default count values are dependent upon a type of communication link coupled between a source and the apparatus.

In another specific implementation, the apparatus includes a slave storage coupled to the programmable storage and configured to store a copy of the plurality of count values in a second plurality of locations. Each of said second plurality of locations may be configured to be incremented and decremented during use. The control circuit may be configured to increment a given location of the second plurality of locations in response to a corresponding location within the buffer becoming available. The control unit may be further configured to decrement the given location of the second plurality of locations in response to a notification of the corresponding available location being sent.

In another embodiment, a method of allocating locations within a buffer is contemplated. The method includes storing a plurality of control packets in a plurality of storage locations. Each of the plurality of control packets belongs to one of a plurality of virtual channels. The method also includes determining a number of the plurality of locations to allocate to each of the plurality of virtual channels. Further, the method includes allocating the plurality of storage locations by storing a plurality of count values within a programmable storage. Each of the count values may be indicative of the number of said plurality of storage locations allocated to a respective one of the plurality of virtual channels.

BRIEF DESCRIPTION OF THE DRAWINGS

FIG. 6 is a diagram depicting one embodiment of a coherent link NOP packet.

Figure 1:
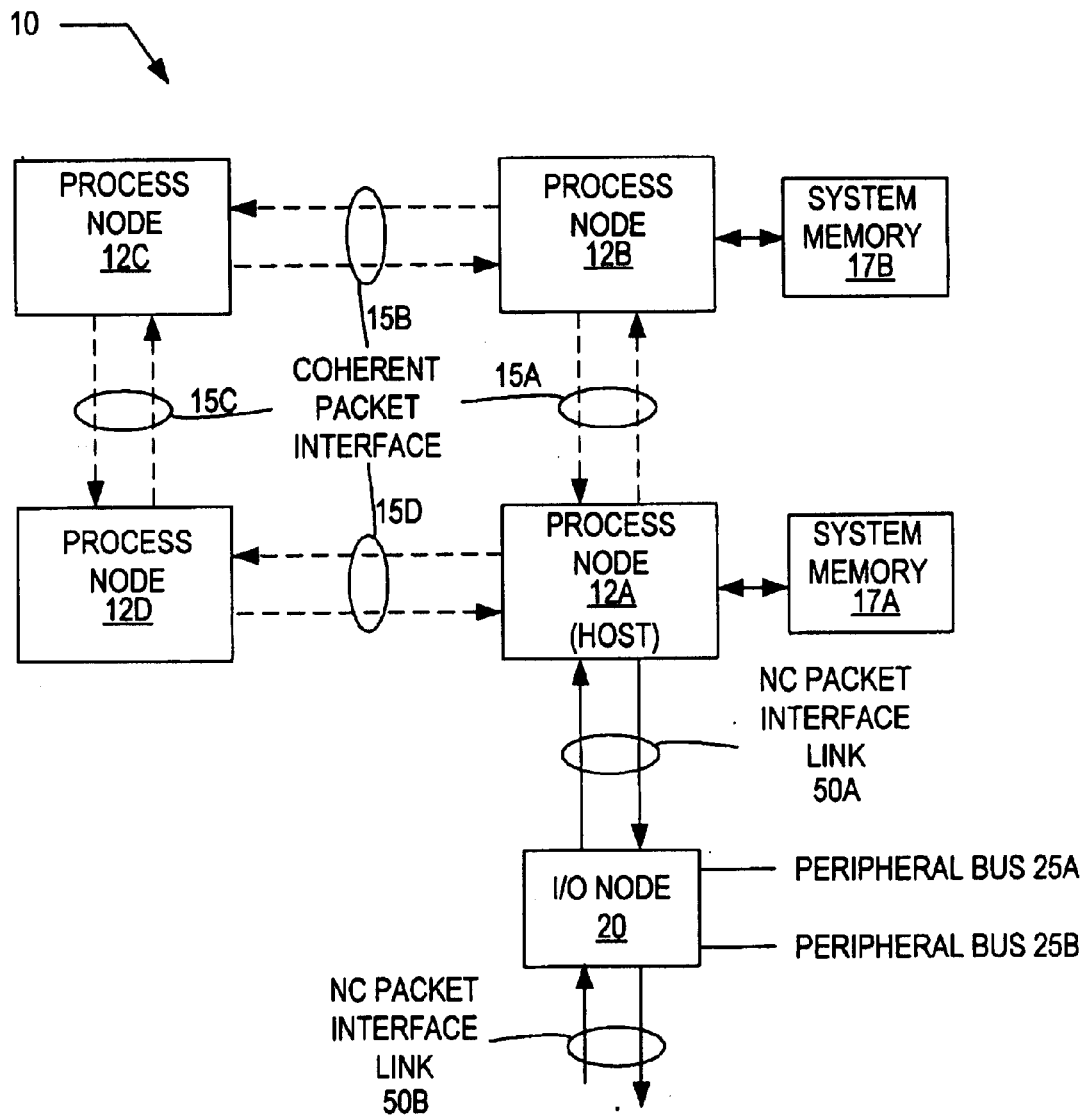
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. Computer system 10 includes process nodes 12A–12D each interconnected by coherent packet interfaces 15A–D. Each link of coherent packet interface 15 may form a high-speed point-to-point link. Process nodes 12A and 12B are also coupled to system memory 17A and 17B, respectively. Process nodes 12A–D may each include one or more processors, a memory controller for managing memory transactions to memory such as memories 17A–B. Computer system 10 also includes an I/O node 20 which is coupled to process node 12A via a non-coherent packet interface 50A. I/O node 20 may be connected to another I/O node (not shown) in a chain topology for example, by non-coherent packet interface 50B. Process node 12A is illustrated as a host node and may include a host bridge for communicating with I/O node 20 via NC packet interface 50A. Process nodes 12B–D may also include host bridges for communication with other I/O nodes (not shown). The non-coherent packet interface links formed by NC packet interface 50A–B may also be referred to as point-to-point links. I/O node 20 is connected to a pair of peripheral buses 25A–B. As will be described in greater detail below, process nodes 12A–D and I/O node 20 may also include interface circuitry (not shown in FIG. 1) for managing packet transfers between nodes. It is noted that in other embodiments, other numbers of process nodes may be used. Further, it is contemplated that each of process nodes 12C and 12D may also be connected to a system memory.

In the present embodiment, each link of coherent packet interface 15 is implemented as sets of unidirectional lines (e.g. lines 15A are used to transmit packets from processing node 12A to processing node 12B and lines 15B are used to transmit packets from processing node 12B to processing node 12C). Other sets of lines 15C–D are used to transmit packets between other processing nodes as illustrated in FIG. 1. The coherent packet interface 15 may be operated in a cache coherent fashion for communication between processing nodes ("the coherent link"). Further, non-coherent packet interface 50 may be operated in a non-coherent fashion for communication between I/O nodes and between I/O nodes and a host bridge such as the host bridge of process node 12A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processing node to another may pass through one or more intermediate nodes. For example, a packet transmitted by processing node 12A to processing node 12C may pass through either processing node 12B or processing node 12D as shown in FIG. 1. Any suitable routing algorithm may be used. Other embodiments of computer system 10 may include more or fewer processing nodes than the embodiment shown in FIG. 1.

One example of a packet interface such as non-coherent packet interface 50 may be compatible with HyperTransport™ technology. Peripheral buses 25A and 25B are illustrative of a common peripheral bus such as a peripheral component interconnect (PCI) bus. It is understood, however, that other types of buses may be used. An exemplary NOP packet for the coherent packet interface is discussed in greater detail below in conjunction with FIG. 6 and an exemplary NOP packet for the non-coherent packet interface is discussed in greater detail below in conjunction with FIG. 7.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of process node 12A from an I/O node and "downstream" refers to packet traffic flow in the direction away from the host bridge of process node 12A to an I/O node. As will be described in greater detail below, to preserve the ordering rules of the various buses that may be connected to a given I/O node, the node may provide transaction reordering as well as packet buffering. Likewise, other nodes may include buffers for preventing commands from blocking each other due to logical conflicts between packets of a given type.

Generally speaking, a "virtual channel" is a communication path for carrying packets between various processing nodes and I/O nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links. Thus, a separate receiving buffer for each virtual channel may be available prior to transmission, the virtual channels do not block each other even while using this shared resource.

In one embodiment, control packets include commands such as posted and non-posted writes, non-posted reads, and probes. In addition, control packets include responses. Thus, to support operation as described above, the coherent packet interface may support four virtual channels: posted, non-posted, response and probe. The non-coherent packet interface may support a sub-set of these virtual channels. Specifically, the probe virtual channel may not be supported (since probes are used to maintain coherency). It is noted however, that in other embodiments, other virtual channels are contemplated and may be used and supported.

As will be described in greater detail below, the interface circuits within each node may include independent virtual channel buffer locations for receiving packets from the respective link and for buffering packets to be transmitted upon the link. Computer system 10 may employ any suitable flow control mechanism for transmitting packets. For example, in one embodiment, each node may store a count of the number of each type of virtual channel buffer within the receiver at the other end of the link to which each interface logic is connected. The node does not transmit a packet unless the receiving node has a free buffer to store the packet. As receiving buffer locations are freed by routing packets onward, the receiving interface logic transmits notifications to the sending interface logic to indicate that the buffer locations have been freed.

Figure 2:
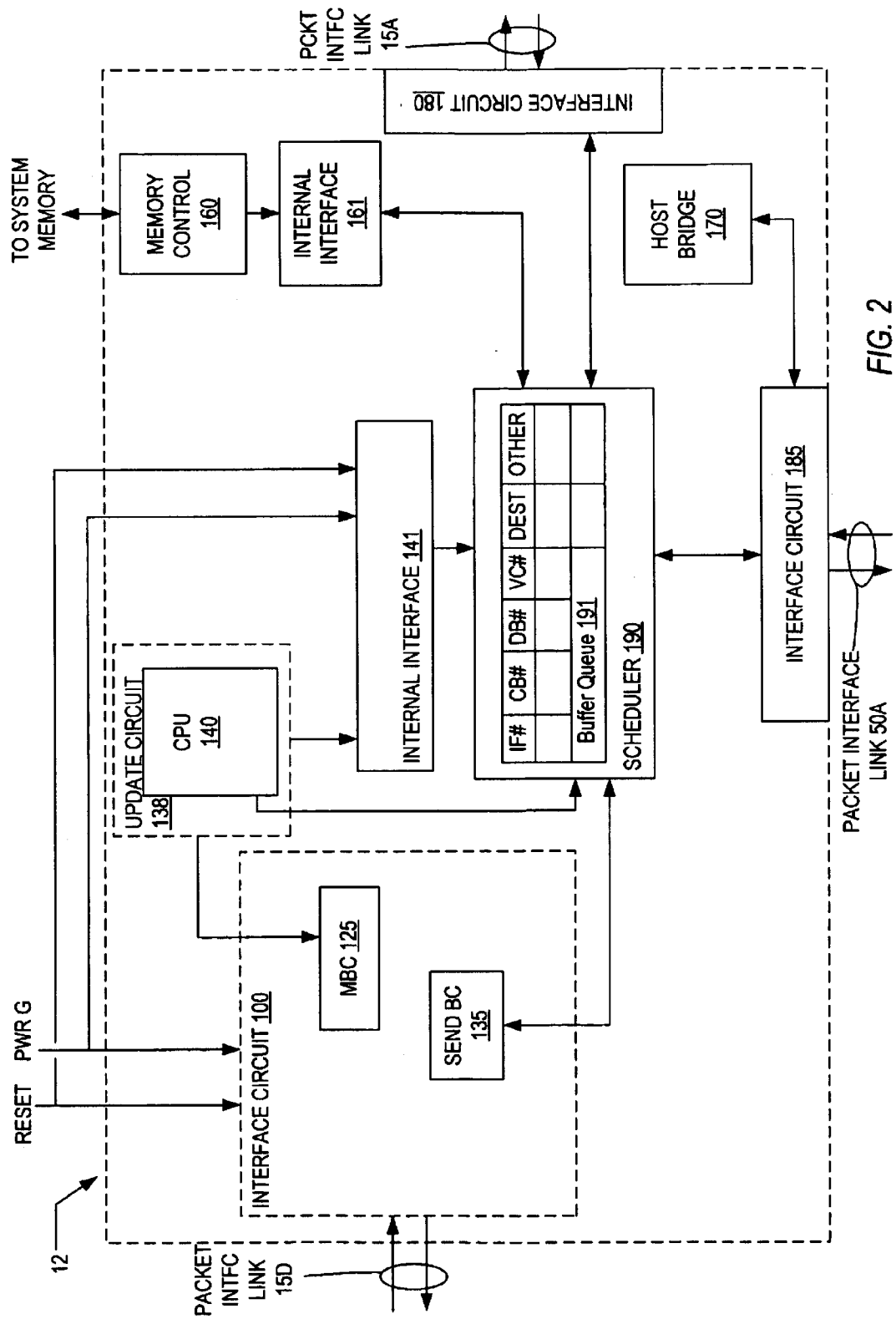
FIG. 2 is a block diagram of one embodiment of a process node.

Referring to FIG. 2, a block diagram of one embodiment of a process node is shown. Circuit components that correspond to those shown in FIG. 1 are numbered identically for simplicity and clarity. The node is representative of any of process nodes 12A–D of FIG. 1 and will hereafter be referred to as process node 12 for simplicity. Process node 12 of FIG. 2 includes a CPU 140 coupled to interface circuits 100, 141, 161, 180, 185 and a scheduler 190. Scheduler 190 is also coupled to each of interface circuit 100, 161, 180 and 185. In addition, interface circuits 100, 180 and 185 are coupled to packet interface links 15D, 15A and 50A, respectively. Further, interface circuits 100, 141, 161, 180 and 185 are coupled to each other for conveying control and data packets between the interface circuits. Interface circuit includes a master buffer count storage (MBC) 125 and a Send buffer count (BC) storage 135. Further, each interface circuit may include a command buffer and a data buffer (not shown in FIG. 2). Process node 12 also includes a host bridge 170 shown coupled to interface circuit 185. It is noted however that in other embodiments, host bridge may be coupled to either of interface circuits 100 or 185, dependent upon whether a particular interface circuit is coupled to a non-coherent packet interface. Additionally, process node 12 includes a memory controller coupled to internal interface 161. It is further noted that although the command buffer and data buffer may be included in each interface circuit, it is contemplated that in other embodiments, one command buffer and one data buffer (not shown) may be shared by each of the interface circuits.

Generally speaking, each of interface circuits 100, 141, 161, 180 and 185 may be configured to receive packets from other nodes and to transmit packets to other nodes. The transmitted packets may be internally generated or may be received on one interface and routed out through another interface. A typical transaction may include a command packet, one or more response packets and one or more data packets depending on the type of transaction. Other transactions such as coherent transactions may include probe packets and probe response packets. Responses may indicate data packets are following (e.g. read responses do indicate data packets are following) or responses may be positive acknowledgements of transactions (e.g. source done and target done packets).

When an interface circuit such as interface circuit 100 receives a packet, interface circuit 100 may identify the virtual channel for the packet and whether the packet is a control packet or a data packet. Interface circuit 100 may be configured to place control packets into the command buffer (shown in FIG. 2A) and any data packets into the data buffer (shown in FIG. 2A).

In one embodiment, MBC 125 may be a programmable storage such as a register (i.e. each location may be written with a new value at any time during operation). MBC 125 may be programmed by executing instructions to read and write the register. For example MBC 125 may be memory mapped, or may be a special purpose register (SPR) addressed by move to/from SPR instructions (e.g. the Model Specific Registers in the x86 instruction set). As will be described in greater detail below, the command and data buffers may each be a pool of buffer locations, which may be allocated to and divided up between any of the virtual channels. MBC 125 is configured to store a plurality of count values each indicative of the number of locations within the command and data buffer that have been allocated to respective virtual channels. In addition, since MBC 125 may be written during operation, the number of buffers reserved for each virtual channel may be allocated and subsequently changed. It is contemplated that in other embodiments, MBC 125 may be a random access memory (RAM) storage or any other type of storage.

Interface circuit 100 may be further configured to transmit information about a received packet to scheduler 190, which may allocate an entry in a buffer queue 191 corresponding to the packet. Buffer queue 191 may include a plurality of fields for each entry. For example, the information may contain such fields as an interface number (IF#) identifying the interface circuit which received the packet, an index number (CB#) identifying the entry within the command buffer storing the control packet, an index number (DB#) identifying the entry within the data buffer storing any corresponding data packets, a virtual channel number (VC#) indicating the virtual channel to which the packet belongs and an indication of the destination of the packet (DEST).

Scheduler 190 may be configured to control the flow of packets from one interface circuit to another interface circuit within process node 12. Scheduler 190 may schedule packets for transmission to an internal interface such as interface circuit 141 or to an interface circuit such as interface circuit 185 using the destination information of the packets in entries pointed to within buffer queue 191. As will be described further below, scheduler 190 may check Send BC 135 for available buffer space in the corresponding virtual channel at the destination. If buffer space is available, scheduler 190 may notify the transmitting interface circuit that packets are to be transmitted and scheduler 190 may read the control packet and any data packets corresponding to the index numbers within the command buffer and data buffer of the interface circuit which received the packets, respectively. The control and data packets may then be transferred to the appropriate interface circuit for transmission to the destination. It is contemplated that scheduler 190 may route the packets based upon any suitable method, such as the use of routing tables, for example.

Send BC 135 is a storage unit such as a register, for example. Send BC 135 may be configured to store count values of available locations corresponding to command and data buffers within another node, such as the node coupled to the other end of packet interface 15D. During initialization, the other node may transmit count values of the number of available locations corresponding to its respective virtual channels in the form of buffer release notifications. The Send BC 135 may initialize with these count values. As packets are transmitted to the receiver of that node, the count values corresponding to the type of packets sent may be decremented within Send BC 135. In addition, as buffer locations at the other node become available, that node may send corresponding buffer release notifications to interface circuit 100 and the corresponding count values in send BC 135 may be incremented. Further, as described above, scheduler 190 may check the availability of the other node's receiver buffers by checking the count values within Send BC 135 prior to transferring any pending packets to interface circuit 100. It is noted that in other embodiments, Send BC 135 may be configured to be incremented as packets are transmitted and decremented as locations become available, if desired.

CPU 140 may be configured to execute programmed instructions. Those instructions may be application specific or they may be instructions associated with an operating system. In one embodiment, CPU 140 may be configured to execute instructions which may monitor the flow of packets through a given interface circuit during operation of process node 12. CPU 140 may be further configured to execute instructions which may dynamically determine the number of locations to allocate to each virtual channel within the command buffer and data buffer. The number of locations may be based upon the observed flow of packets. In an alternative embodiment, CPU 140 may use the type of node and the types of packet interface links connected to the node in determining an updated number of locations to allocate to each virtual channel within the command buffer and data buffer. In one embodiment, the count values indicating the number of buffer locations determined by CPU 140 may be stored in a table or other data structure and retrieved by CPU 140 once the number is determined. Further, CPU 140 may execute instructions which may cause a set of count values that correspond to the number of locations to be written into MBC 125. It is noted that the number of locations to allocate to a given virtual channel may be determined experimentally in a laboratory environment and stored within process node 12 for use by CPU 140 (e.g. in non-volatile storage such as NVRAM).

In the illustrated embodiment, host bridge 170 is coupled to interface circuit 185 and may be configured to facilitate transactions occurring between interface circuit 185 and another interface. Thus, in one embodiment packet bus link 50A may be a non-coherent packet bus link. Host bridge 170 may include one or more queues and tables(not shown) configured to convert coherent transactions targeted for non-coherent link 50A and vice versa.

In the illustrated embodiment, CPU 140 is coupled to internal interface 141. Internal interface 141 includes components similar to interface circuit 100, with the exception of an interface control and Send BC register. Thus CPU 140 may perform the functions described above relative to the interface control.

Memory controller 160 is shown coupled to internal interface 161. Memory controller 160 may be configured to control transactions to and from a system memory such as system memory 17A of FIG. 1. Internal interface 161 contains components similar to and thus operates substantially the same as internal interface 141.

Figure 8:
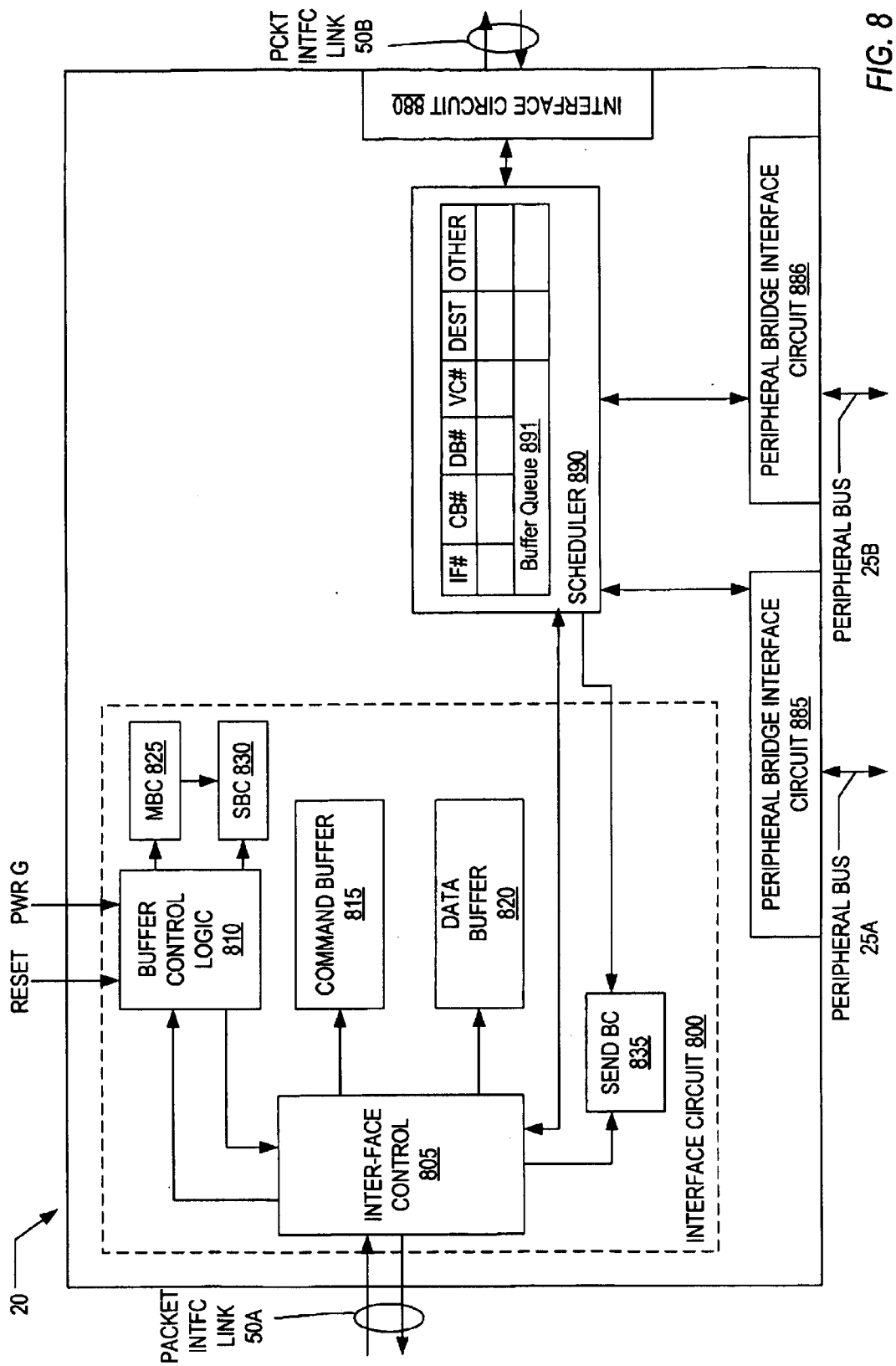
FIG. 8 is a block diagram of one embodiment of an I/O node.

It is noted that although the circuitry described above is shown within process node 12, it is contemplated that in other embodiments, the interface circuits and scheduler may also be included in an I/O node such as I/O node 20 of FIG. 1. FIG. 8 shown below illustrates one embodiment of an I/O node including such interface circuitry. As will be described in greater detail below in conjunction with the description of FIG. 8, the updated number of locations to allocate to each virtual channel within a command buffer and a data buffer may be sent from a process node such as process node 12.

It is noted that, a particular computer system configuration may be used where a given interface circuit is not connected to any link (i.e. the interface is unused). In such a configuration, it is contemplated that one or more of the remaining interface circuits may use the command buffer and data buffer of the unused interface circuit. In such an implementation, one or more multiplexing circuits (not shown) may selectively route the respective read and write paths to the unused command and data buffers thereby increasing the available buffer space between remaining interface circuits.

It is also noted that, while FIG. 2 illustrates a central scheduler for packets received at various interface circuits, it is contemplated that other embodiments may use distributed schedulers.

Figure 2A:
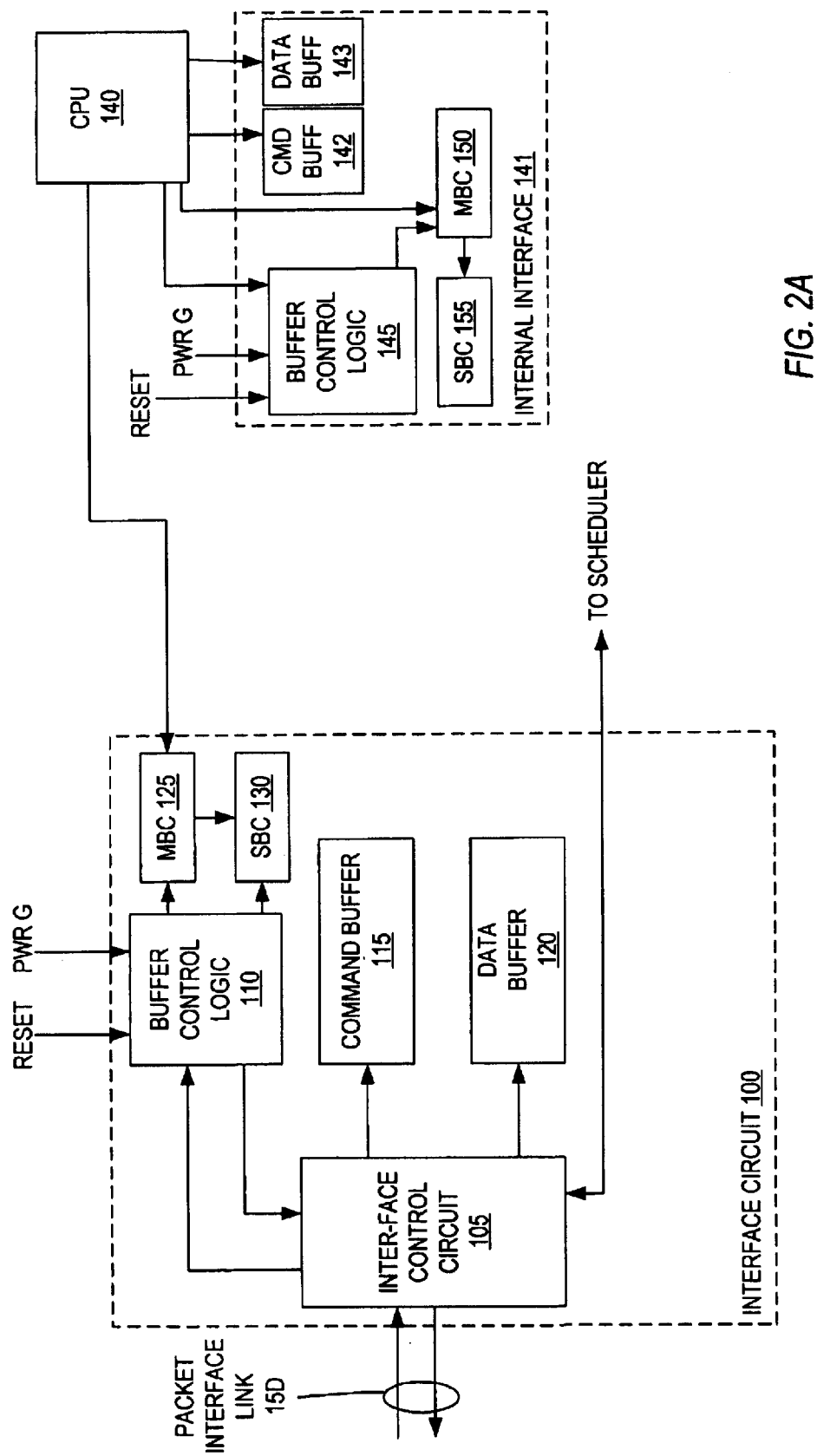
FIG. 2A is a block diagram of one embodiment of an interface circuit of FIG. 2.

Turning to FIG. 2A, a block diagram illustrating one embodiment of an interface circuit is shown. Circuit components that correspond to those shown in FIG. 1 and FIG. 2 are numbered identically for simplicity and clarity. In the illustrated embodiment, interface circuits 100, 180 and 185 may be similar to each other. Thus, the internal circuitry of interface circuits 180 and 185 has been omitted from the illustrated embodiment for simplicity. Thus, only interface circuit 100 will be described. Interface circuit 100 may be part of process node 12 as shown in FIG. 1. Interface circuit 100 includes an interface control circuit 105 coupled to packet interface link 15D. Interface circuit 100 also includes a command buffer 115 and a data buffer 120 each coupled to interface control circuit 105. Interface circuit 100 also includes a buffer control logic 110 coupled to a register labeled master buffer count (MBC) 125. MBC 125 is coupled to another register labeled slave buffer count (SBC) 130. In the illustrated embodiment, CPU 140 and internal interface 141 are shown to exemplify the operation of interface 100 within process node 12 of FIG. 1.

Command buffer 115 and data buffer 120 may be storage units such as random access memory (RAM) banks, registers, etc. Each of command buffer 115 and data buffer 120 include a plurality of locations. Each of the locations within command buffer 115 and data buffer 120 may have an address and be accessed independently of each other location. The width of each location in command buffer 115 may be as wide as the widest control packet, although not all bytes may be used for control packets having shorter lengths. Typical control packets may be either 4 or 8 bytes in length, although other lengths are contemplated. Typical data packets may be from 4 to 64 bytes in length although other lengths are contemplated.

When interface 100 receives a packet via packet interface link 15D, interface control circuit 105 may be configured to identify the virtual channel for the packet and whether the packet is a control packet or a data packet. Interface control circuit 105 may also be configured to place control packets into command buffer 115 and any data packets into data buffer 120. Interface control 105 may notify buffer control logic 110 of the type of link. In addition, as described above in conjunction with the description of FIG. 2, interface control circuit 105 may transmit information about a received packet to a scheduler such as scheduler 190 of FIG. 2.

Buffer control logic 110 may be configured to detect particular reset conditions. Although many types of reset conditions may exist within the overall system, two types of reset conditions may be detected which will be discussed herein. The two types of resets are: a cold reset and a warm reset. A cold reset may be indicative of a reset that may occur during system initialization such as during a power-on sequence. A warm reset may be indicative of the type of reset that may occur after power is already on and may be initiated through a software routine, through hardware or both. A warm rest may be used when the entire system does not necessarily need to be reinitialized. In the illustrated embodiment, a cold reset may be signaled via an assertion of a Reset signal and a de-assertion of a PWR G signal. In the illustrated embodiment, a warm reset may be signaled via an assertion of the Reset signal and an assertion of the PWR G signal. It is noted that in other embodiments, cold reset and warm reset may be signaled by any other signaling mechanism.

Buffer control logic 110 may be configured to store a set of predefined default count values within MBC 125 in response to a cold reset. However, it is contemplated that in other embodiments the default values may be programmable through software or hardware methods. The default count values may be dependent upon the type of communication link connected to interface control circuit 105. Interface control circuit 105 may be further configured to determine to which type of packet interface link it is connected. For example, in the illustrated embodiment, a given link may be a coherent link or a non-coherent packet link. As mentioned above, the two types of links have different virtual channels, thus a different set of default values may be stored within MBC 125 depending upon the type of link coupled to interface circuit 100. For example, a coherent link supports probe commands and therefore the set of default values may include a non-zero probe virtual channel count value. In contrast, a non-coherent link does not support probe commands and therefore the set of default values may include a zero probe virtual channel count value, thereby allocating no buffer locations to the probe virtual channel. It is noted that in another embodiment, it is contemplated that two separate MBC registers may be used; one for coherent link default values and one for non-coherent link default values. In such an embodiment, buffer control logic 110 may be configured to select which MBC register to use based upon the link type.

Once a set of default count values has been stored within MBC 125, those values may be copied into SBC 130. After a reset, SBC 130 may contain non-zero count values. The count values stored within SBC 130 may be incremented or decremented during operation. To notify a node at the other end of packet interface link 15D of the number of buffers allocated to each virtual channel, a buffer release notification may be initiated by buffer control logic 110 and sent for each non-zero count value within SBC 130. For each buffer release notification sent, the corresponding count value within SBC 130 may be decremented by the number of buffers indicated in the buffer release notification. In addition, during operation, when scheduler 190 of FIG. 1 reads a packet from a buffer location corresponding to a given virtual channel within command buffer 115 or data buffer 120, scheduler 190 may cause the corresponding count value within SBC 130 to be incremented for each packet read. Thus, SBC 130 may contain a working count of the number of outstanding buffer releases to be sent. It is noted that a pending buffer release may not be sent immediately, but may be sent at a later time. It is contemplated that several buffer releases may be sent to a sending node in a NOP packet.

As described above, MBC 125 may be a programmable register. Accordingly, CPU 140 may write a set of updated count values into MBC 125 during operation. To allow the updated values to be used once the updated values are written into MBC 125, CPU 140 may cause a warm reset. In response to the warm reset, the updated count values now stored in MBC 125 may be copied into SBC 130. It is noted that the default count values mentioned above are not loaded into MBC 125 in response to a warm reset. However, either a cold reset or a warm rest may cause the values stored within MBC 125 to be copied into SBC 130. Loading MBC 125 with updated count values creates a different allocation of buffer locations to the virtual channels than the default allocation, whereby command buffer 115 and data buffer 120 are divided into different numbers of locations allocated to the virtual channels. With updated non-zero values loaded into SBC 130, buffer release counts may be sent to the node connected to the other end of packet link 15D.

Figure 3:
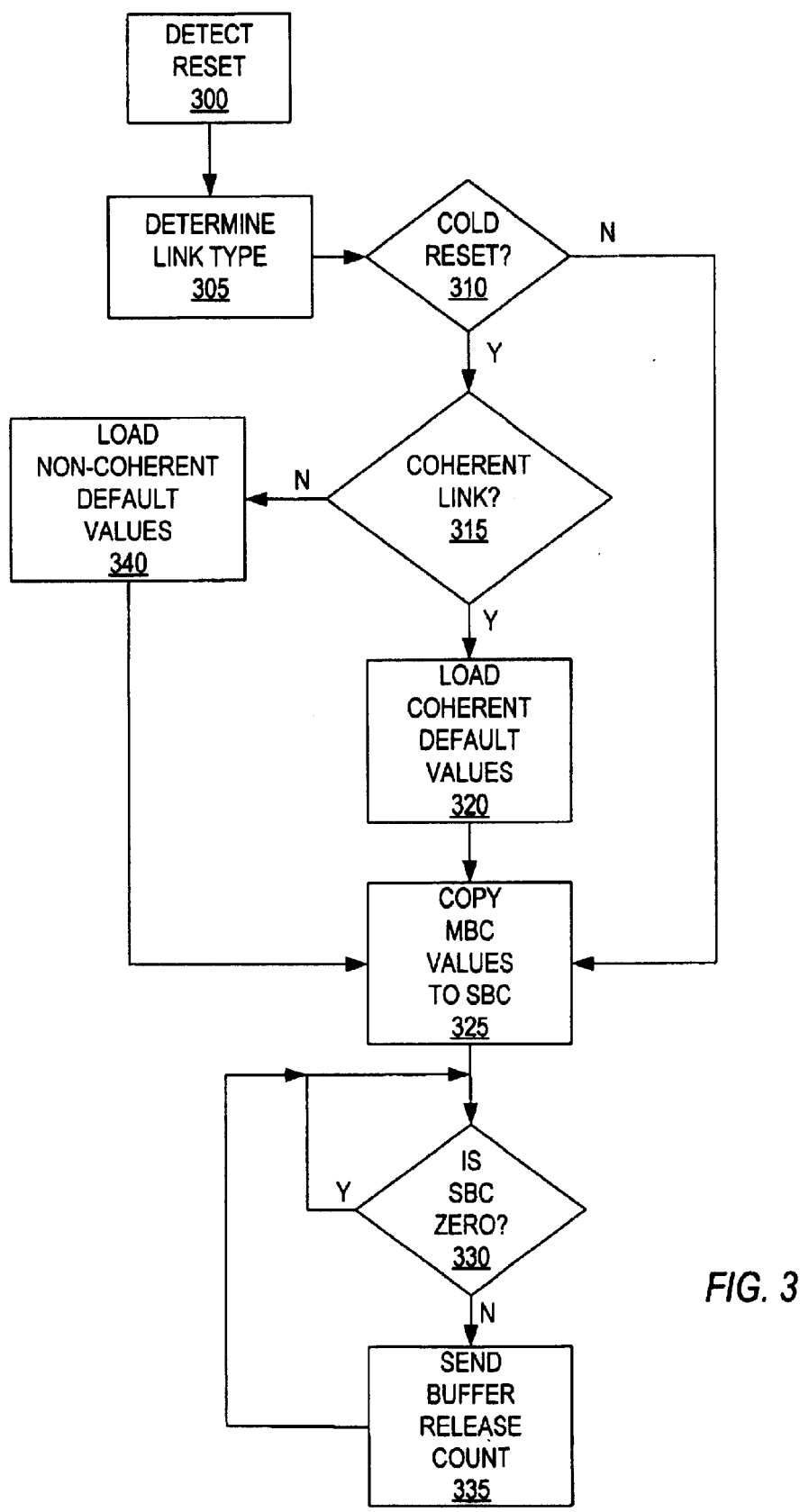
FIG. 3 is a flow diagram depicting operation of one embodiment of a process node.

Turning to FIG. 3, a flow diagram describing operation of one embodiment of a process node is shown. Beginning in block 300, a reset may be asserted. Buffer control logic 110 of interface circuit 100, detects the reset. Interface control circuit 105 determines the type of communication link connected to the interface (block 305). For example, in one embodiment, interface control circuit 105 waits for the first packet to arrive (block 305). The first packet after a reset may be a NOP packet. One of the fields in the NOP packet identifies the link type (e.g. coherent or non-coherent). The link type may be stored for later use. Interface control circuit 105 also notifies buffer control 110 of the link type (block 305). If the reset is a cold reset (decision block 310) the link type is checked and if the link is a coherent link (decision block 315) buffer control logic 110 causes a set of default count values corresponding to the virtual channels of a coherent link to be stored within master buffer count register 125 (block 320). If the link is not a coherent link(decision block 315), buffer control logic 110 causes a set of default count values corresponding to the virtual channels of a non-coherent link to be stored within master buffer count register 125 (block 340).

The set of count values stored within MBC 125 are copied into SBC 130 (block 325). Buffer control logic 110 compares the count values stored within SBC 130 to zero (decision block 330). If the count is zero, no buffer release notifications are sent. If the count values stored within SBC 130 are not zero (decision block 330), buffer control logic 110 initiates one or more NOP packet transactions to a node on the other end of the packet interface link 15D (block 335). The NOP packets contain buffer count fields for each of the virtual channel types, indicating to the node at the other end the number of buffer locations that are available in the each of the respective virtual channels. Each time a NOP packet is sent, the corresponding count values within SBC 130 are decremented by the number of buffers released via the transmitted NOP packet.

Thus, the combination of events described in blocks 330 and 335 occurs not only in response to a reset condition as described above, but also in response to buffer locations becoming available. As packets are received during normal operation, scheduler 190 may route the received packets to their destination. As each packet is read from a given buffer, a buffer location becomes available. Thus, SBC 130 is incremented and becomes non-zero. Again if the count values stored within SBC 130 are not zero (decision block 330), buffer control logic 110 initiates one or more NOP packet transactions to a node on the other end of the packet interface link 15D (block 335). If a reset occurs during operation, the reset is detected by buffer control logic 110 as in block 300.

Referring back to decision block 310, if the reset is not a cold reset, then it is a warm reset. The count values stored in MBC 125 are copied into SBC 130 (block 325) without updates to the default values, and operation continues in the manner described above.

Figure 4:
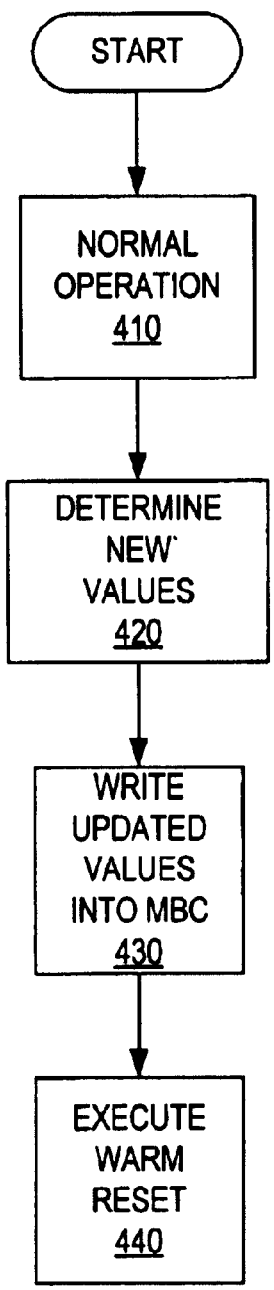
FIG. 4 is another flow diagram describing operation of one embodiment of a process node.

Referring to FIG. 4, a flow diagram describing operation of one embodiment of a process node is shown. Process node 12 of FIG. 2 is in normal operation (block 410). Buffer count values have been loaded and packets are being received by the various interface circuits. As packets are read and removed from command buffer 115 and data buffer 120, the respective count values within SBC 130 are incremented. As buffer releases are sent, SBC 130 is decremented accordingly. CPU 140 is executing instructions to determine new count values (block 420). CPU 140 may monitor the packet flow through process node 12 and the utilization of command buffer 115 and data buffer 120. CPU 140 may determine a number of locations to allocate to each virtual channel within command buffer 115 and data buffer 120 based upon the observed flow. Alternatively, the new values may be determined experimentally and stored within a storage such as a non-volatile storage. Block 420 may represent CPU 140 retrieving the new values. CPU 140 executes code that causes the updated values to be written into MBC 125 (block 430). CPU 140 executes code that causes a warm reset to be issued (block 440). The warm reset may be a software instruction in one embodiment or in an alternative embodiment, hardware may issue the warm reset in response to software execution. Once the warm reset is issued in process node 12, operation may proceed at block 300 of FIG. 3.

Figure 5:
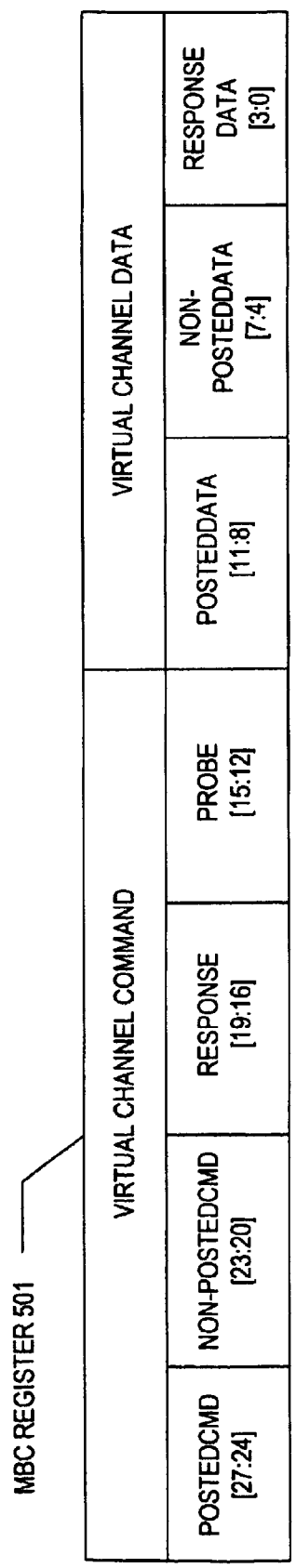
FIG. 5 is a diagram illustrating one embodiment of a master buffer count register.

Turning to FIG. 5, a diagram illustrating one embodiment of a master buffer count register is shown. In the illustrated embodiment, master buffer count (MBC) register 501 includes seven fields labeled postedcmd, non-postedcmd, response, probe, posteddata, non-posteddata, responsedata. These seven fields correspond to the four virtual channels described in conjunction with FIG. 1. The four virtual channels are posted command, non-posted command, response and probe. Thus, there are four buffer counts for control packets in each of the four virtual channels; postedcmd, non-postedcmd, response and probe. Three of the virtual channels may carry data packets; posted commands, non-posted commands and response. Thus, data buffers may be allocated for these virtual channels. The data buffer fields are; posteddata, non-posteddata and responsedata. Each field is configured to store a buffer count value corresponding to the number of locations allocated to the respective virtual channel within command buffer 115 or data buffer 120 as described above in FIG. 2.

In the illustrated embodiment, each of the fields includes four bits which may store values between zero and 15. The first field, postedcmd, includes bits 27:24 and is used to indicate the number of locations within command buffer 115 that are allocated to the posted command virtual channel. The second field, non-postedcmd, includes bits 23:20 and is used to indicate the number of locations within command buffer 115 that are allocated to the non-posted command virtual channel. The third field, response, includes bits 19:16 and is used to indicate the number of locations within command buffer 115 that are allocated to the response virtual channel. The fourth field, probe, includes bits 15:12 and is used to indicate the number of locations within command buffer 115 that are allocated to the probe virtual channel. The fifth field, posteddata, includes bits 11:8 and is used to indicate the number of locations within data buffer 120 that are allocated to the posted data virtual channel. The sixth field, non-posteddata, includes bits 7:4 and is used to indicate the number of locations within data buffer 120 that are allocated to the non-posted data virtual channel. The seventh field, responsedata, includes bits 3:0 and is used to indicate the number of locations within data buffer 120 that are allocated to the response data virtual channel.

Although the illustrated embodiment shows 28 bits with each field containing four bits, it is contemplated that other embodiments may contain other numbers of bits and other numbers of fields as necessary.

Referring now to FIG. 6, a diagram depicting one embodiment of a coherent link NOP packet is shown. Coherent NOP packet 610 includes multiple fields made up of bits 0–7, or one byte. Additionally, the packet includes bit times 0–3, and thus is a 4-byte packet. During bit time zero, bits 0–5 are used to encode the type of command and labeled CMD[5:0], while bits 6–7 are reserved. In the illustrated embodiment, the encoding of CMD[5:0] may be 000000, which is indicative of a NOP. During bit time 1, bits 0–1 are used to encode the count value of the number of buffer spaces that are available for posted commands and it is labeled POSTCMD [1:0]. Bits 2–3 are used to encode the number of buffer spaces that are available for posted data and are thus labeled POSTDATA [1:0]. Bits 4–5 are used to encode the number of buffer spaces that are available for response commands and are thus labeled RESPONSE [1:0]. Bits 6–7 are used to encode the number of buffer spaces that are available for response data and are thus labeled RESPONSEDATA [1:0]. Similarly, during bit time 2, bits 0–1 are used to encode the count value of the number of buffer spaces that are available for non-posted commands and it is labeled NON-POSTCMD[1:0]. Bits 2–3 are used to encode the number of buffer spaces that are available for non-posted data and are thus labeled NON-POSTDATA [1:0]. Bits 4–5 are used to encode the number of buffer spaces that are available for probe commands and are thus labeled PROBE [1:0]. Thus, up to 3 buffer locations of each virtual channel may be released via the corresponding count value fields. Bit 7 is used to encode the type of link being used to convey the packet. In the illustrated embodiment, bit 7 contains a one for the link type. A value of one is indicative of a coherent link. During bit time 3, all bits may be reserved and may not contain any encoding for NOP packets.

Figure 7:
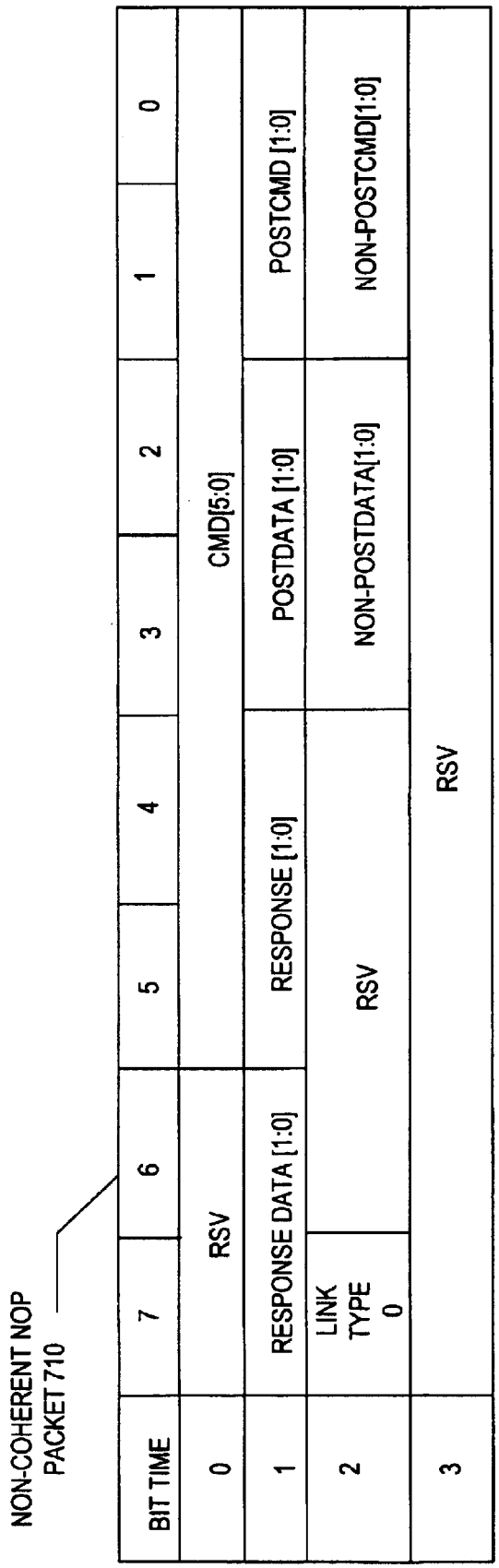
FIG. 7 is a diagram depicting one embodiment of a non-coherent link NOP packet.

Turning to FIG. 7, a diagram depicting one embodiment of a non-coherent link NOP packet is shown. Non-coherent NOP packet 710 includes multiple fields and is similar to coherent link NOP packet of FIG. 6 with the exceptions during bit time 2. Bits 4–5 are reserved during bit time 2 of FIG. 7 since there is no probe command in the non-coherent link. Further, bit 7 contains a zero for the link type. In the illustrated embodiment, a zero is indicative of a non-coherent link. It is contemplated however, that in other embodiments, a zero may be used to indicate a coherent link and a one may be used to indicate a non-coherent link.

Referring to FIG. 8, a block diagram of one embodiment of an I/O node is shown. Circuit components that correspond to those shown in FIG. 1 and FIG. 2 are numbered identically for simplicity and clarity. I/O node 20 includes an interface circuit 800, coupled to a packet bus link 50A. I/O node 20 also includes an interface circuit 880 coupled to a packet bus link 50B. Further, I/O node 20 includes a peripheral bridge interface circuit 885 and a peripheral bridge interface circuit 886 coupled to a peripheral bus 25A and 25B, respectively. I/O node 20 further includes a scheduler 890 coupled to each of interface circuits 800 and 880 and each of peripheral bridges 885 and 886.

It is noted that interface circuit 800 includes circuitry that is substantially the same as interface circuit 100 of FIG. 2, thus the operational description will be limited to the differences between interface circuit 800 of FIG. 8 and interface circuit 100 of FIG. 2. For example, MBC 125 may have been written with updated values directly by CPU 140. In FIG. 8, there is no CPU shown, and thus MBC 825 may have updated count values written to it by a remote CPU such as CPU 140 of FIG. 2. In one embodiment, MBC 825 of FIG. 8 may be memory mapped into the address space accessible by CPU 140 of FIG. 2. Thus, during operation CPU 140 may execute an I/O write of an updated count value to MBC 825.

It is also noted that interface circuit 880 includes circuitry that is substantially the same as interface circuit 800 and thus the operation is substantially the same as interface circuit 800.

Peripheral bridge interface circuit 885 and peripheral bridge interface circuit 886 may be configured to convey transactions between peripheral buses 25A and 25B, respectively and one of interface circuits 800, 880 and 885. Peripheral bridge interface circuit 885 and a peripheral bridge interface circuit 886 may also include interface circuitry (not shown) similar to interface circuit 800. Further, peripheral bridge interface circuit 885 and a peripheral bridge interface circuit 886 may be configured to translate packet transactions into transactions suitable for transmission upon peripheral buses 25A and 25B, respectively.

Thus, I/O node 20 may receive and transmit packet transactions in substantially the same way as process node 12 using interface circuits that operate in substantially the same way. In contrast, during operation, I/O node interface circuits may be updated by a remote update circuit such as CPU 140 of process node 12.

Numerous variations and modifications will become apparent to those skilled in the art once the above disclosure is fully appreciated. It is intended that the following claims be interpreted to embrace all such variations and modifications.

What is claimed is:

1. An apparatus comprising:
a buffer including a plurality of storage locations configured to store a plurality of control packets each belonging to one of a plurality of virtual channels;
a programmable storage configured to store a plurality of count values, wherein each of said count values is indicative of a number of said plurality of storage locations allocated to a respective one of said plurality of virtual channels; and
an update circuit configured to write said plurality of count values to said programmable storage.

2. The apparatus as recited in claim 1 wherein said update circuit is further configured to determine said number of said plurality of locations to allocate to each of said plurality of virtual channels.

3. The apparatus as recited in claim 1 further comprising a control circuit coupled to said programmable storage and configured to cause a plurality of default count values to be stored within said programmable storage in response to detecting a cold reset.

4. The apparatus as recited in claim 3, wherein said default count values are dependent upon a type of communication link coupled between a source and said apparatus.

5. The apparatus as recited in claim 3 wherein said control circuit is further configured to load a copy of said plurality of count values from said programmable storage into a slave storage in response to detecting a warm reset.

6. The apparatus as recited in claim 5, wherein said slave storage is configured to store a copy of said plurality of count values in a second plurality of locations, wherein each of said second plurality of locations is configured to be incremented and decremented during use.

7. The apparatus as recited in claim 6, wherein said control circuit is further configured to increment a given location of said second plurality of locations in response to a corresponding location within said buffer becoming available.

8. The apparatus as recited in claim 7, wherein said control circuit is further configured to decrement said given location of said second plurality of locations in response to a notification of said corresponding available location being sent.

9. The apparatus as recited in claim 1 further comprising a second buffer including a second plurality of storage locations configured to store a plurality of data packets each belonging to one of said plurality of virtual channels, wherein each of said count values is further indicative of a number of said second plurality of storage locations allocated to said respective one of said plurality of virtual channels.

10. The apparatus as recited in claim 1, wherein said update circuit is further configured to cause said warm reset to be issued in response to writing said plurality of count values to said programmable storage.

11. A computer system comprising:
one or more process nodes interconnected by a plurality of first links;
an I/O node coupled to said one or more process nodes by a second link;
wherein each of said one or more process nodes and said I/O node includes an apparatus, said apparatus including:
a buffer including a plurality of storage locations configured to store a plurality of control packets each belonging to one of a plurality of virtual channels;
a programmable storage configured to store a plurality of count values, wherein each of said count values is indicative of a number of said plurality of storage locations allocated to a respective one of said plurality of virtual channels; and
an update circuit configured to write said plurality of count values to said programmable storage.

12. The computer system as recited in claim 11, wherein said update circuit is further configured to determine said number of said plurality of locations to allocate to each of said plurality of virtual channels.

13. The computer system as recited in claim 11 further comprising a control circuit coupled to said programmable storage and configured to cause a plurality of default count values to be stored within said programmable storage in response to detecting a cold reset.

14. The computer system as recited in claim 13, wherein said default count values are dependent upon a type of said first bus link and said second link.

15. The computer system as recited in claim 13, wherein said control circuit is further configured to load a copy of said plurality of count values from said programmable storage into a slave storage in response to detecting a warm reset.

16. The computer system as recited in claim 15, wherein said slave storage is configured to store a copy of said plurality of count values in a second plurality of locations, wherein each of said second plurality of locations is configured to be incremented and decremented during use.

17. The computer system as recited in claim 16, wherein said control circuit is further configured to increment a given location of said second plurality of locations in response to a corresponding location within said buffer becoming available.

18. The computer system as recited in claim 17, wherein said control circuit is further configured to decrement said given location of said second plurality of locations in response to a notification of said corresponding available location being sent.

19. The computer system as recited in claim 11 further comprising a second buffer including a second plurality of storage locations configured to store a plurality of data packets each belonging to one of said plurality of virtual channels, wherein each of said count values is further indicative of a number of said second plurality of storage locations allocated to said respective one of said plurality of virtual channels.

20. The computer system as recited in claim 11, wherein said update circuit is further configured to cause said warm reset to be issued in response to writing said plurality of count values to said programmable storage.

21. A method comprising:

storing a plurality of control packets in a plurality of storage locations of a buffer, wherein each of said plurality of control packets belongs to one of a plurality of virtual channels, determining a number of said plurality of locations to allocate to each of said plurality of virtual channels;

allocating said plurality of storage locations by storing a plurality of count values within a programmable storage, wherein each of said count values is indicative of said number of said plurality of storage locations allocated to a respective one of said plurality of virtual channels.

22. The method as recited in claim 21 further comprising causing a plurality of default count values to be stored within said programmable storage in response to detecting a cold reset.

23. The method as recited in claim 22, wherein said default count values are dependent upon a type of communication link.

24. The method as recited in claim 21 further comprising storing a plurality of data packets into a plurality of storage locations within a second buffer, wherein each of said plurality of data packets belongs to one of said plurality of virtual channels.

25. The method as recited in claim 21 further comprising storing a copy of said plurality of count values into a slave storage in response to detecting a warm reset.

26. The method as recited in claim 25 further comprising causing said warm reset to be issued in response to storing said plurality of count values within said programmable storage.

27. The method as recited in claim 26 further comprising incrementing a given location within said slave storage in response to a corresponding location within said buffer or said second buffer becoming available.

28. The method as recited in claim 27 further comprising decrementing said given location within said slave storage in response to a notification of said corresponding available location being sent.

* * * * *